United States Patent
Heinonen et al.

(10) Patent No.: US 10,828,657 B2
(45) Date of Patent: Nov. 10, 2020

(54) TRAVERSING FRONT ARM

(71) Applicant: NLB Corp., Wixom, MI (US)

(72) Inventors: Tim D. Heinonen, Linden, MI (US); David W. Mackie, Waterford, MI (US)

(73) Assignee: NLB CORP., Wixom, MI (US)

( * ) Notice: Subject to any disclaimer, the term of this patent is extended or adjusted under 35 U.S.C. 154(b) by 136 days.

(21) Appl. No.: 15/914,011

(22) Filed: Mar. 7, 2018

(65) Prior Publication Data

US 2019/0275548 A1    Sep. 12, 2019

(51) Int. Cl.
| | | |
|---|---|---|
| B05B 13/04 | (2006.01) | |
| F16L 3/015 | (2006.01) | |
| B05B 13/00 | (2006.01) | |
| E01H 1/10 | (2006.01) | |
| B60R 16/08 | (2006.01) | |

(52) U.S. Cl.
CPC ........ *B05B 13/0431* (2013.01); *B05B 13/005* (2013.01); *B60R 16/08* (2013.01); *E01H 1/101* (2013.01); *F16L 3/015* (2013.01)

(58) Field of Classification Search
CPC ....... B05B 13/005; B60R 16/08; E01H 1/101; F16L 3/015
USPC .... 239/159, 160, 165, 166, 170, 172, 587.1, 239/587.2, 722, 750, 752, 754; 134/172, 134/198
See application file for complete search history.

(56) References Cited

U.S. PATENT DOCUMENTS

| | | | |
|---|---|---|---|
| 3,217,620 A | | 11/1965 | Mindrum et al. |
| 5,273,059 A | | 12/1993 | Gross et al. |
| 5,368,232 A | * | 11/1994 | Schroeder ............. B05B 9/0403 239/165 |
| 6,010,079 A | * | 1/2000 | Mayfield, Jr. ....... A01M 7/0014 239/159 |
| 6,739,612 B2 | | 5/2004 | Colistro |
| 7,798,158 B2 | | 9/2010 | Crocker |
| 9,610,603 B2 | | 4/2017 | Wright |
| 2007/0204889 A1 | | 9/2007 | Crocker |
| 2009/0241999 A1 | | 10/2009 | Crocker |
| 2017/0157636 A1 | | 6/2017 | Wright |

* cited by examiner

*Primary Examiner* — Steven J Ganey
(74) *Attorney, Agent, or Firm* — Carlson, Gaskey & Olds, P.C.

(57) ABSTRACT

An arm assembly for a waterjet truck according to an exemplary aspect of the present disclosure includes a traversing mount bracket at a first end of the arm. The traversing mount bracket is configured to permit the arm to translate in a linear direction. The arm further includes a joint configured to permit rotational movement.

18 Claims, 2 Drawing Sheets

TRAVERSING FRONT ARM

BACKGROUND

This application relates to a mobile high pressure water cleaning system, such as is known for cleaning highways or runways, wherein a front arm facilitates movement of a blast head over the surface to be cleaned.

High pressure water cleaning systems are known, and may include a movable platform carrying water jets that moves along a surface to be cleaned, such as a runway or highway. These high pressure water cleaning systems may be utilized to remove markings from a surface, such as paint markings on a road or runway. Often, the movable platform is mounted to the front of a truck. The truck supports a pump and a water storage tank. The pump delivers extremely high pressure water to the surface via the water jets. As an example, pressures of approximately 40,000 psi may be used. The water efficiently removes materials from the surface to be cleaned.

In some known systems, the movable platform is mounted to the front of the truck via an arm. The arm may include a plurality of linkages and rotational joints to allow the front arm to move the movable platform over the surface.

SUMMARY

In one aspect of this disclosure, an arm assembly for a waterjet truck comprises a traversing mount bracket at a first end of the arm. The traversing mount bracket is configured to permit the arm to translate in a linear direction. The arm further includes a joint configured to permit rotational movement.

In another aspect of this disclosure, a waterjet truck comprises a tank, a high pressure pump, and an arm. The arm has a first end mounted to the front of the truck at a traversing mount bracket.

These and other features of the present invention can be best understood from the following specification and drawings, the following of which is a brief description.

BRIEF DESCRIPTION OF THE DRAWINGS

The drawings can be briefly described as follows.

DETAILED DESCRIPTION

Figure 1:
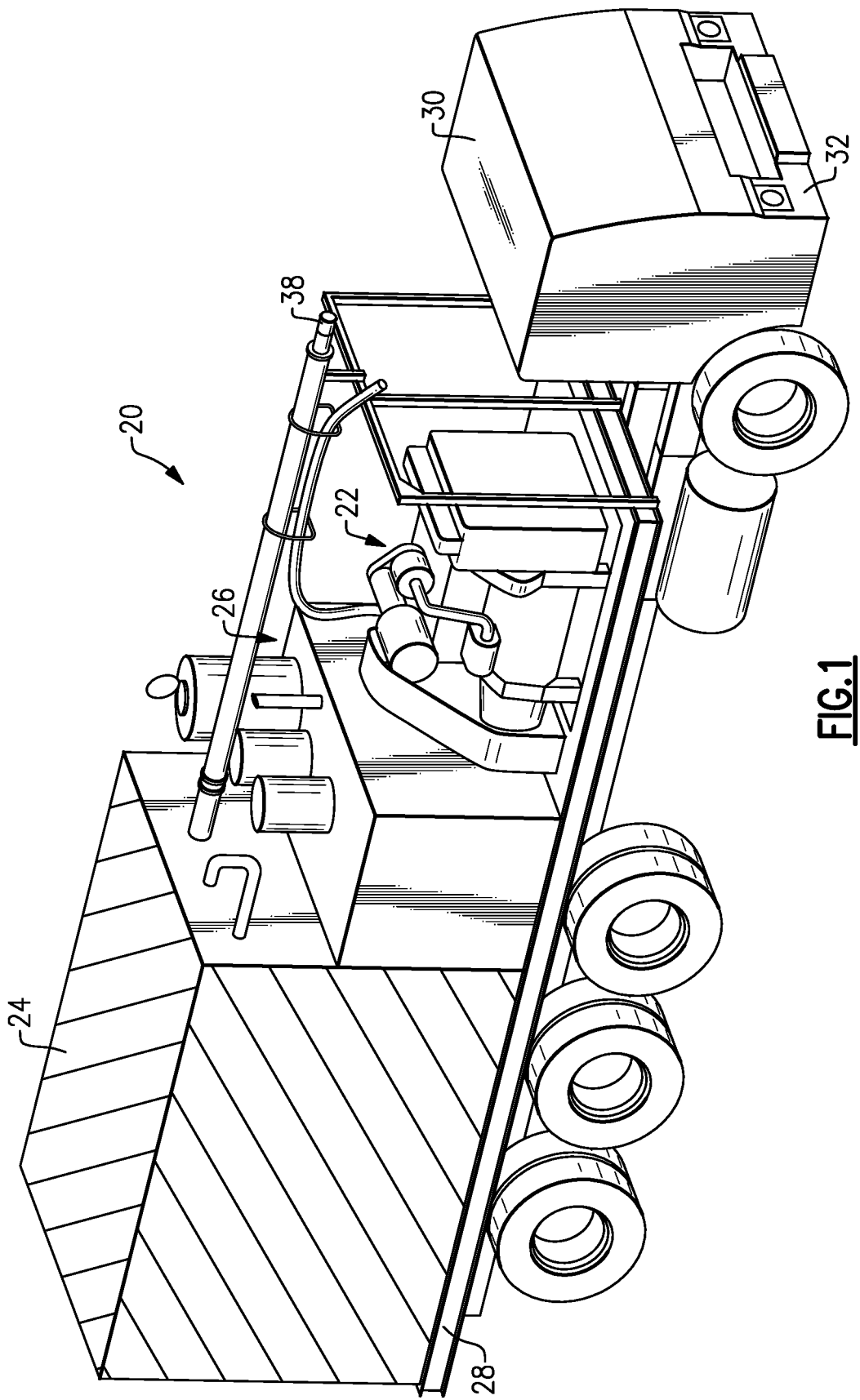
FIG. 1 illustrates an exemplary high pressure water cleaning tuck.

FIG. 1 illustrates an example mobile marking removal system 20. This example system 20 includes a high-pressure pump 22, a water tank 24, and a vacuum system 26 to recover water and debris. In this system 20, each of these components is carried on a truck 28. Although a truck 28 is illustrated, other vehicle types, such as a tractor may be utilized within the scope of the invention. In an embodiment, a front end portion 30 of the truck 28 may be a truck cab with a front bumper 32.

In the system 20, water is delivered from the high pressure pump 22 to a surface to be cleaned, such as a roadway. The water that is delivered to the surface may have a pressure on the order of 40,000 psi. Other pressures, both higher and lower, may be used.

In the illustrated embodiment, the system 20 includes a vacuum system 26 that pulls water and debris from the surface back onto the truck 28. The vacuum system 26 may include a vacuum line, a vacuum basket, a vacuum power unit, a vacuum tank, a cartridge filter, and a vacuum pump. The vacuum pump is powerful enough to pull the waste water and removed debris back onto the truck 28 from the surface.

Figure 2:
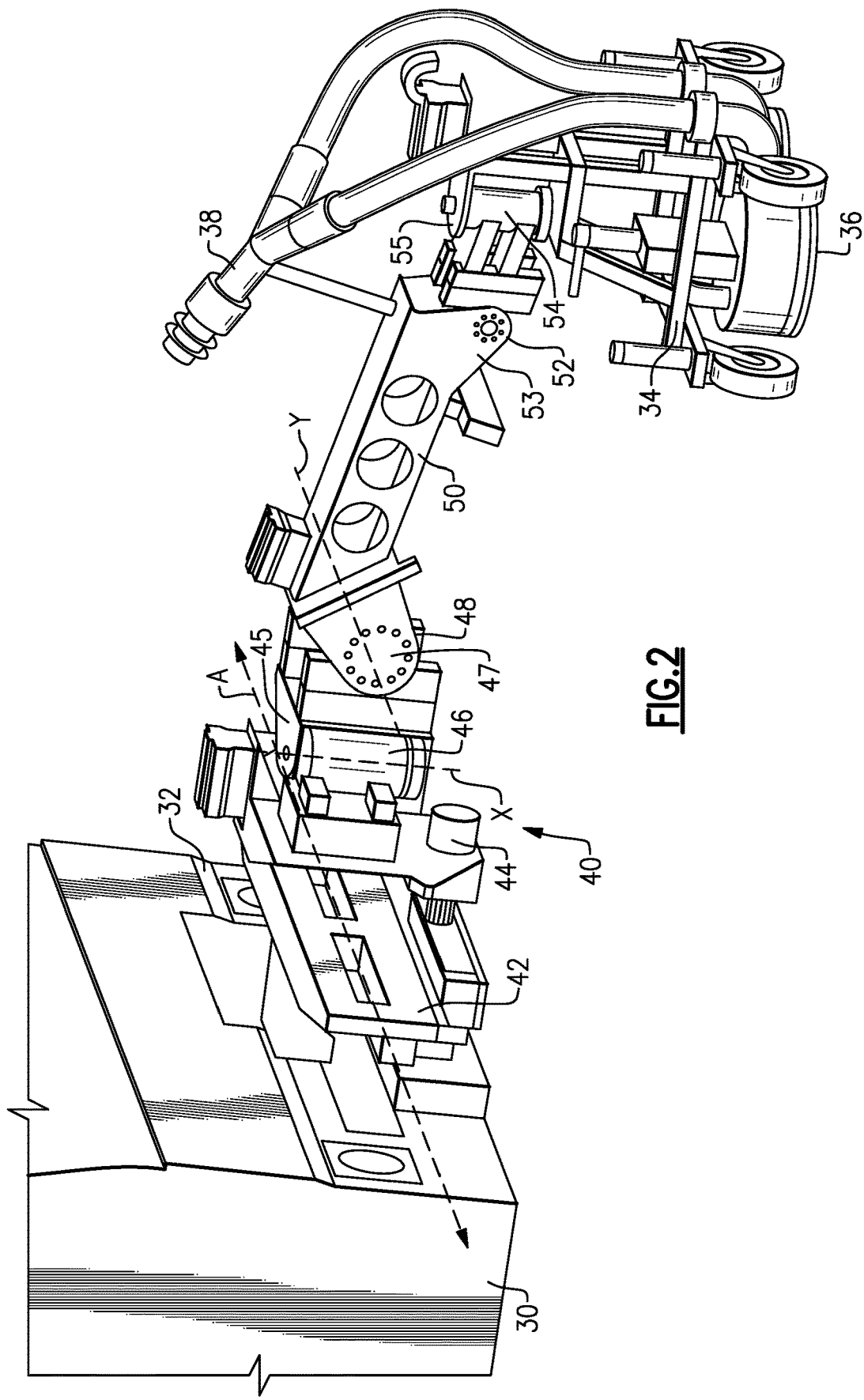
FIG. 2 illustrates a front arm assembly for the high pressure water cleaning truck of FIG. 1.

A shown in FIG. 2, the system 20 includes a platform 34 carrying a nozzle 36, which may be as known and available from NLB Corporation. An example nozzle 36 is a spin jet nozzle and includes rotating waterjets that remove markings from a surface, such as a roadway or airport runway. The platform 34 may be driven independent of the truck 28. The high pressure pump 22 delivers water to the nozzle 36 through a high pressure water line 38. The platform 34 moves along the surface to be cleaned, spraying high pressure water to remove materials from the surface. The platform 34 may also remove wastewater and debris from the surface and return the wastewater and debris back onto the truck 28 via the vacuum system 26. An example platform 34 is mounted to the front bumper 32 of the truck 28 via an arm assembly 40.

The arm assembly 40 includes several links, joints, and actuators to facilitate movement of the platform 34 over the surface being cleaned. The positioning of the platform 34 may be controlled by a user inside a cab of the truck 28. The platform 34 may be controlled via a joystick, for example. The platform 34 and truck 28 may also be controlled via switches and/or a touchscreen.

The arm assembly 40 is secured to the front bumper 32 of the truck 28 via a traversing mount bracket 42. The traversing mount bracket 42 is secured to the front bumper 32, and allows the arm assembly 40 to translate in a direction A that is parallel with the front bumper 32. The direction A may further be defined as being parallel to the surface to be cleaned. In some embodiments, the translating movement along direction A is facilitated by an actuator 44. In the illustrated embodiment, the actuator 44 is a rotary actuator. In other embodiments, the translating movement in direction A may be facilitated by a linear actuator. The actuator 44 may be an electrical, hydraulic, pneumatic, or other type of actuator.

In the illustrated embodiment, the arm assembly 40 includes several additional joints and actuators. For example, a joint 45 permits rotation about an axis X that is perpendicular to the direction A, and an actuator 46 facilitates the movement about axis X. A second joint 47 and a second actuator 48 facilitate movement about an axis Y that is perpendicular to axis X. In an embodiment the actuators 46, 48 are rotary actuators. In the illustrated embodiment, the arm assembly 40 further includes a link 50 and actuators 52, 54. The actuators 52, 54 facilitate movement about joints 53 and 55, respectively. The actuators 44, 46, 48, 52, 54 may be robotically controlled by an operator, and allow the operator to raise, lower, sweep, extend, retract, or rotate the arm assembly 40. In some examples, a video camera may be used on the arm assembly 40 to allow the operator to see the area around the platform 34.

The traversing mount bracket 42 allows for linear movement of the arm assembly 40 in addition to the various joints and actuators that allow for rotational movement. This configuration allows for movement of the platform 34 in many directions with fewer linkages and actuators required than if the arm assembly 40 were only capable of rotational movement. The traversing mount bracket 42 also allows a wider path for the platform 34 with fewer links than a stationary mount bracket. The movement of the platform 34 in many directions allows the nozzle 36 to be aligned with markings to be removed from the roadway or other surface being cleaned. This expanded movement further allows an operator of the vehicle 28 to position the platform 34 beyond the edge of the front bumper 32 of the truck, which may be helpful to clean a roadway from a single lane.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An arm assembly for a waterjet truck, comprising:
   a traversing mount bracket at a first end of the arm assembly, the traversing mount bracket configured to permit the arm assembly to translate in a linear direction;
   a joint configured to permit rotational movement;
   a first actuator configured to facilitate the translating in the linear direction; and
   a second actuator configured to facilitate the rotational movement at the joint about an axis that is perpendicular to the linear direction.

2. The arm assembly as recited in claim 1, wherein the first actuator is a first rotary actuator.

3. The arm assembly as recited in claim 1, further comprising a second joint configured to permit rotational movement.

4. The arm assembly as recited in claim 3, wherein a third actuator is configured to facilitate rotational movement at the second joint.

5. The arm assembly as recited in claim 3, wherein the joint permits rotational movement about a first axis, and the second joint permits rotational movement about a second axis, the second axis being perpendicular to the first axis.

6. The arm assembly as recited in claim 1, wherein the traversing mount bracket is configured to be mounted on a front bumper of a waterjet truck.

7. The arm assembly as recited in claim 6, wherein the linear direction is parallel to the front bumper.

8. The arm assembly as recited in claim 6, wherein a platform having a nozzle is mounted on a second end of the arm assembly.

9. The arm assembly as recited in claim 8, comprising a third joint at the second end of the arm assembly.

10. The arm assembly as recited in claim 9, comprising an actuator configured to facilitate rotational movement at the third joint.

11. The arm of claim 8, wherein the nozzle is configured to deliver fluid having a pressure of about 40,000 psi to a surface.

12. A waterjet truck, comprising:
    a truck having a tank and a high pressure pump; and
    an arm having a first end mounted to a front of the truck at a traversing mount bracket, the arm comprising an elongated link having at least one bracket and actuator at the first end and at a second end, wherein the actuator at the first end is configured to facilitate translation of the arm along a linear direction, and the actuator at the second end is configured to facilitate rational movement about an axis, the axis perpendicular to the linear direction.

13. The waterjet truck of claim 12, wherein the arm is configured to traverse in a direction parallel to the front of the truck.

14. The waterjet truck of claim 12, comprising a platform having a nozzle mounted to a second end of the arm.

15. The waterjet truck of claim 12, comprising a first actuator configured to facilitate linear movement of the arm at the traversing mount bracket.

16. The waterjet truck of claim 12, wherein the arm has a plurality of brackets and actuators at both the first and second ends.

17. The waterjet truck of claim 12, wherein the arm is configured to be controlled by an operator in a cab of the truck.

18. The waterjet truck of claim 14, wherein the nozzle is configured to deliver fluid having a pressure of about 40,000 psi to a surface.

* * * * *